US012055054B2

(12) United States Patent
Jain et al.

(10) Patent No.: US 12,055,054 B2
(45) Date of Patent: Aug. 6, 2024

(54) LIGHT WEIGHT FAN CASING CONFIGURATIONS FOR ENERGY ABSORPTION

(71) Applicant: General Electric Company, Schenectady, NY (US)

(72) Inventors: Nitesh Jain, Bengaluru (IN); Nicholas J. Kray, Evendale, OH (US); Veeraraju V, Bengaluru (IN); Deepak Ghiya, Bengaluru (IN); Sreekanth Kumar Dorbala, Bengaluru (IN); Kishore Budumuru, Bengaluru (IN); Apostolos Karafillis, Lynn, MA (US); Thomas Chadwick Waldman, Lynn, MA (US); Theodore E Anderson, West Chester, OH (US); Joel F. Kirk, Evendale, OH (US); Edward A. Rainous, West Chester, OH (US); Michael E Eriksen, West Chester, OH (US); Mojibur Rahman, Evendale, OH (US)

(73) Assignee: General Electric Company, Cincinnati, OH (US)

( * ) Notice: Subject to any disclaimer, the term of this patent is extended or adjusted under 35 U.S.C. 154(b) by 61 days.

(21) Appl. No.: 17/234,371

(22) Filed: Apr. 19, 2021

(65) Prior Publication Data

US 2022/0333501 A1 Oct. 20, 2022

(51) Int. Cl.
*F01D 21/04* (2006.01)
*F01D 25/24* (2006.01)

(52) U.S. Cl.
CPC ........... *F01D 21/045* (2013.01); *F01D 25/24* (2013.01); *F05D 2220/36* (2013.01); *F05D 2240/20* (2013.01)

(58) Field of Classification Search
CPC .... F01D 21/045; F01D 25/24; F05D 2220/36; F05D 2240/20
See application file for complete search history.

(56) References Cited

U.S. PATENT DOCUMENTS

| | | | |
|---|---|---|---|
| 3,241,813 A | 3/1966 | Von Flue et al. | |
| 4,861,391 A | 8/1989 | Rioja et al. | |
| 5,344,280 A * | 9/1994 | Langenbrunner | F01D 21/045 428/116 |
| 6,394,746 B1 | 5/2002 | Sathianathan et al. | |
| 6,439,842 B1 | 8/2002 | Toomey et al. | |
| 6,575,694 B1 * | 6/2003 | Thompson | F01D 21/045 415/200 |

(Continued)

FOREIGN PATENT DOCUMENTS

| | | |
|---|---|---|
| CN | 104264083 | 1/2015 |
| CN | 110883319 | 3/2020 |

(Continued)

*Primary Examiner* — Brian P Wolcott
(74) *Attorney, Agent, or Firm* — HANLEY, FLIGHT & ZIMMERMAN, LLC

(57) ABSTRACT

Light weight fan casing configurations for energy absorption are disclosed herein. An apparatus includes a first set of metal bands positioned within a containment casing of a turbofan engine, and a second set of metal bands traversing the first set of metal bands, the first set of metal bands and the second set of metal bands to surround at least a portion of the turbofan engine.

19 Claims, 10 Drawing Sheets

(56) References Cited

U.S. PATENT DOCUMENTS

| | | | | |
|---|---|---|---|---|
| 7,285,326 | B2 | 10/2007 | Schmidt et al. | |
| 7,753,312 | B2 | 7/2010 | Schmidt et al. | |
| 8,444,092 | B2 | 5/2013 | Li et al. | |
| 9,598,978 | B2 | 3/2017 | Hoyland et al. | |
| 10,450,892 | B2 | 10/2019 | Ranjan | |
| 10,634,002 | B2 * | 4/2020 | Scott | F02K 3/06 |
| 2012/0134774 | A1 * | 5/2012 | Clark | B65D 51/14 415/9 |
| 2017/0198716 | A1 * | 7/2017 | Crutchfield | F04D 29/526 |
| 2020/0011203 | A1 * | 1/2020 | Prabhakar | F01D 25/005 |
| 2020/0165936 | A1 | 5/2020 | Kasal et al. | |
| 2020/0165937 | A1 | 5/2020 | Donisi et al. | |
| 2020/0308986 | A1 | 10/2020 | Slayter et al. | |
| 2020/0340400 | A1 * | 10/2020 | Bryan | F02K 3/075 |

FOREIGN PATENT DOCUMENTS

| | | |
|---|---|---|
| RU | 2725563 | 7/2020 |
| WO | WO-2022026215 A2 * | 2/2022 |

* cited by examiner

A-A

LIGHT WEIGHT FAN CASING CONFIGURATIONS FOR ENERGY ABSORPTION

FIELD OF THE DISCLOSURE

This disclosure relates generally to turbofan engines, and, more particularly, to light weight fan casing configurations for energy absorption.

BACKGROUND

Aircraft sometimes encounter situations that endanger the thrust capabilities of associated propellers, such as when a fan blade of a propeller ruptures and/or is released from an associated retention disk (e.g., a fan blade out condition). A thrust capability of the aircraft is vital to the functions of the aircraft and the safety of its passengers. As such, aircraft often utilize protection to limit the damage on the propeller and associated components when a fan blade out condition occurs.

BRIEF DESCRIPTION

Light weight fan casing configurations for energy absorption are disclosed.

Certain examples provide an example apparatus including a first set of metal bands positioned within a containment casing of a turbofan engine, and a second set of metal bands traversing the first set of metal bands, the first set of metal bands and the second set of metal bands to surround at least a portion of the turbofan engine.

Certain examples provide an example casing apparatus including a first portion of a containment casing of a turbofan engine, a second portion of the containment casing, and a protruding portion of the containment casing positioned between the first portion and the second portion, the protruding portion including a structural lattice.

Certain examples provide an apparatus including a containment casing of a turbofan engine, and a trench filler of the turbofan engine positioned between the turbofan engine and the containment casing, the trench filler including a first layer, the first layer including a solid metal, and a second layer, the second layer including at least one of a lattice structure, air, or fluid, the first layer and the second layer to surround at least a portion of the turbofan engine, the first layer and the second layer to alternate in a radial direction

Figure 1:
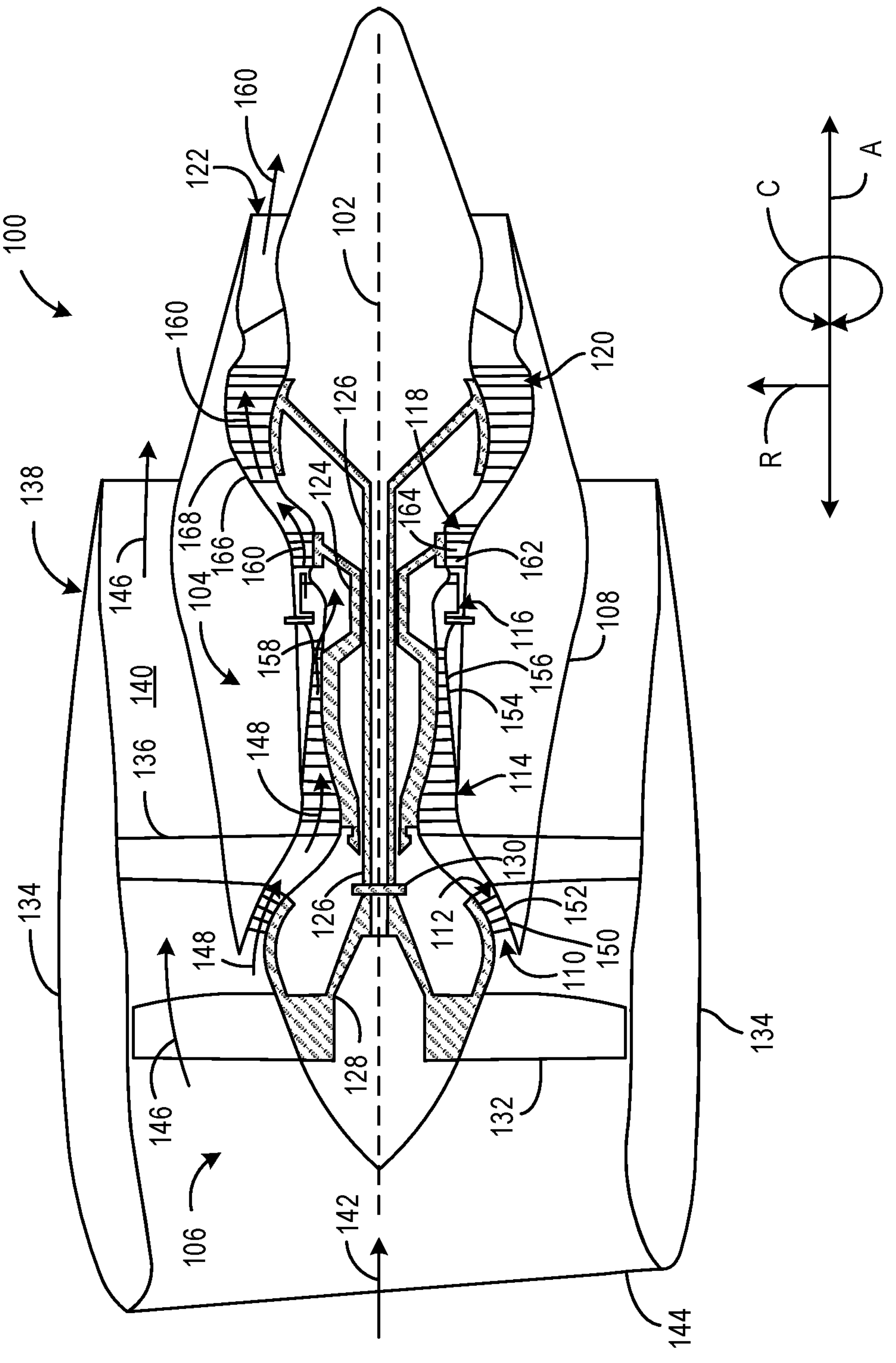
FIG. 1 (PRIOR ART)
FIG. 1 illustrates a schematic cross-sectional view of a prior art example of a turbofan engine.

The figures are not to scale. Instead, the thickness of the layers or regions may be enlarged in the drawings. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

A turbofan engine includes a containment casing with hard or soft walls that circumferentially surround a turbofan. Hard wall containment casings include a thick solid metallic or composite skin, while soft wall containment casings include a thinner metallic or composite wall and/or large Kevlar™ fibers. Soft wall containment casings can address some of the issues presented by hard wall containment casings. For example, soft wall containment casings can absorb a portion of an impact force of a fan blade from a fan blade out (FBO) occurrence. In addition, soft wall containment casings typically include a reduced weight compared to hard wall containment casings. As a result, soft wall containment casings require less supporting material, which reduces costs associated therewith. Further, the reduced weight of the casing and the supporting structures can enable a reduced fuel consumption during an operation of the turbofan. However, soft wall containment casings lack the structural strength of hard wall containment casings and require a large empty volume surrounding the casing to permit deflection during FBO events and to capture the released blade, thus removing it from the flow path where it could cause further damage to the engine. Further, turbofan engines including multiple stages of fan blades typically require metallic hard wall containment casings to provide necessary structural support.

In some examples, a hard wall containment casing incorporates additional structures and/or material to enable impact absorption in case of an FBO occurrence. For example, a hard wall containment casing can include a stiff fan shell, such as a Kevlar™ or composite skin, to enable impact absorption. However, the stiff fan shell or composite skin adds extra weight to the hard wall containment casing, which necessitates additional structural support and increases fuel burn.

To address some of the issues presented by known containment casings, examples disclosed herein provide light weight fan case configurations for energy absorption. In some examples, a containment casing, a trench filler, and/or structures associated therewith protects a turbofan engine when an FBO event occurs. In such examples, the containment casing, the trench filler, and/or the structures associated therewith minimize a weight associated with the protection of the turbofan engine and, in turn, minimize and/or otherwise reduce fuel burn and/or support structures associated with the turbofan engine.

In some examples, a containment casing includes a first set of metal bands and a second set of metal bands traversing the first set. In such examples, the first and second set of metal bands surround at least a portion of the turbofan engine. In some examples, the first and second sets of metal bands are arranged to form an internal truss and/or ribbed structure. In such examples, the first set of bands and the second set of bands are coupled via joining processes (e.g., welding, riveting, bolting, brazing, etc.).

In some examples, the truss and/or ribbed structure includes at least one layer and/or level of the first and second sets of bands that is disposed along a circumference of the containment casing. For example, the truss and/or ribbed structure can be positioned along an inner and/or outer circumference of the containment casing. In some examples, a size (e.g., a width, a thickness, a length, etc.) and/or a geometric architecture (e.g., a geometric spacing, an angular orientation, etc.) of the first and second sets of bands within the truss and/or ribbed structure are configured based on the turbofan engine and/or an area of implementation within the containment casing. For example, multiple layers of the first and second sets of bands can be positioned in predetermined areas of the containment casing to increase an impact absorption and/or stiffness of the containment casing. In some examples, the first set of bands and the second set of bands alternate between different layers and/or levels. In some examples, the first and second sets of bands form a single layer and/or level.

In some examples, the containment casing includes at least two different metals. For example, the containment casing can include bands of aluminum-lithium (e.g., the first set of bands, the second set of bands), which has a higher impact toughness than aluminum with the same density, sandwiched between aluminum-lithium or aluminum sheets. Accordingly, the bands of aluminum-lithium improve an impact toughness and energy absorption of the containment casing while maintaining a weight and/or stiffness thereof. As a result, the containment casing can be utilized in place of a composite fan case to maintain a weight of a soft wall fan case while providing significant cost reductions and improved protection.

In some examples, a deflector plate is coupled to an exterior surface of the containment casing. In such examples, the deflector plate deflects and/or absorbs an impact of a loose fan blades that detaches from an associated retention disc. For example, a first end of the deflector plate can be coupled to the containment casing while a second end of the deflector plate is unattached to deflect objects exiting the containment casing. In some examples, the deflector plate is positioned on a predetermined portion of the exterior surface to provide protection to components external to the turbofan engine, such as gearboxes and/or a full authority digital engine control (FADEC) and associated components, for example.

In some examples, the containment casing and/or a trench filler of the containment casing includes a structural lattice, air, and/or fluid positioned between solid layers (e.g., the bands of aluminum-lithium, metallic sheets, composite sheets, etc.). In some examples, layers of the structural lattice, air, or fluid alternate between the solid layers to form a multilayer containment casing. In addition to being utilized in a hard or soft wall containment casing and/or the trench filler, the multilayer containment casing can be implemented in a compressor casing, a turbine casing, and/or a turbocharger casing.

In some examples, the structural lattice is a gyroid structure produced via additive manufacturing. In such examples, the gyroid structure incudes a metal (e.g., aluminum, aluminum-lithium, titanium, steel, etc.), Kevlar™, or a polymer composite. The gyroid structure provides greater energy absorption capabilities than a honeycomb structure or a solid metal. Accordingly, the gyroid structure absorbs more energy from a loose fan blade and/or fragments thereof than the honeycomb structure or the solid metal when an FBO event occurs, which minimizes damages that result from the FBO event. Further, a thickness of the gyroid structure corresponds to a stiffness thereof and, thus, the thickness of the gyroid structure can be configured based on an area of implementation to provide various sections of the containment casing and/or the trench filler with appropriate stiffnesses.

In some examples, the structural lattice includes a variable volume fraction for tailored stiffness and weight. In some examples, the structural lattice and/or a foam structure are configured based on an area of implementation within the containment casing and/or the trench filler. For example, a section of the containment casing and/or the trench filler that is prone to impact during an FBO event, such as a portion aligned with the fan blades, can include a gyroid structure with a lower volume fraction. As a result, the gyroid structure absorbs fragmentation from the FBO event and prevents and/or otherwise reduces damage to the turbofan engine. In addition, other sections of the containment casing and/or trench filler can include a higher volume fraction gyroid structure to maintain a stiffness of the containment casing for structural support.

In some examples, the containment casing includes a leading portion, a trailing portion, and a protruding portion positioned between the leading portion and the trailing portion. In some examples, the protruding portion includes a structural lattice to provide the containment casing with energy absorption capabilities. For example, the protruding portion can align with fan blades of the turbofan engine to absorb fragments of the fan blades in response to an FBO event occurring, which prevents further damage to other areas of the turbofan engine. In addition, the protruding portion can provide a stiffness to the containment casing. As a result, a thickness of the leading portion and/or the trailing portion can be reduced, which offsets and/or otherwise minimizes a weight added to the containment casing by the protruding portion. Further, an inner circumference of the protruding portion can include a layer of an abradable material to prevent wear on the structural lattice from friction caused by a rotation of the fan blades.

Referring now to the drawings, FIG. 1 is a schematic cross-sectional view of a prior art example of a turbofan engine (e.g., an aircraft engine) 100 that may incorporate various examples disclosed herein. As shown in FIG. 1, the aircraft engine 100 defines a longitudinal or axial centerline axis 102 extending therethrough for reference. In general, the turbofan engine 100 can include a core turbine or a core turbine engine 104 disposed downstream from a fan section 106.

The core turbine engine 104 can generally include a substantially tubular outer casing 108 that defines an annular inlet 110. The outer casing 108 can be formed from multiple segments. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (i.e., a direct-drive configuration). In alternative configurations, the LP shaft 126 may couple to the fan shaft 128 via a reduction gear 130 (i.e., an indirect-drive or geared-drive configuration).

As shown in FIG. 1, the fan section 106 includes a plurality of fan blades 132 ("fan" 132) coupled to and extending radially outwardly from the fan shaft 128. An annular containment casing 134 circumferentially encloses the fan section 106 and/or at least a portion of the core turbine engine 104. In some examples, the containment casing 134 is a hard wall casing that includes a solid metal. In some other examples, the containment casing 134 is a soft wall casing that includes a foam honeycomb structure, a composite structure, and/or a Kevlar™ wrap. The containment casing 134 can be supported relative to the core turbine engine 104 by a forward mount 136. Furthermore, a downstream section 138 of the containment casing can enclose an outer portion of the core turbine engine 104 to define a bypass airflow passage 140 therebetween.

As illustrated in FIG. 1, air 142 enters an intake or inlet portion 144 of the turbofan engine 100 during operation thereof. A first portion 146 of the air 142 flows into the bypass flow passage 140, while a second portion 148 of the air 142 flows into the inlet 110 of the LP compressor 112. One or more sequential stages of LP compressor stator vanes 150 and LP compressor rotor blades 152 (e.g., turbine blades) coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

In addition to aircraft, the turbofan engine 100 serves a similar purpose and sees a similar environment in land-based turbines and/or turbojet engines in which the ratio of the first portion 146 of the air 142 to the second portion 148 of the air 142 is less than that of a turbofan. In each of the turbofan and turbojet engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the turbofan engine 100 defines an axial direction A, a radial direction R, and a circumferential direction C. In general, the axial direction A extends generally parallel to the axial centerline axis 102, the radial direction R extends orthogonally outward from the axial centerline axis 102, and the circumferential direction C extends concentrically around the axial centerline axis 102.

Figure 2:
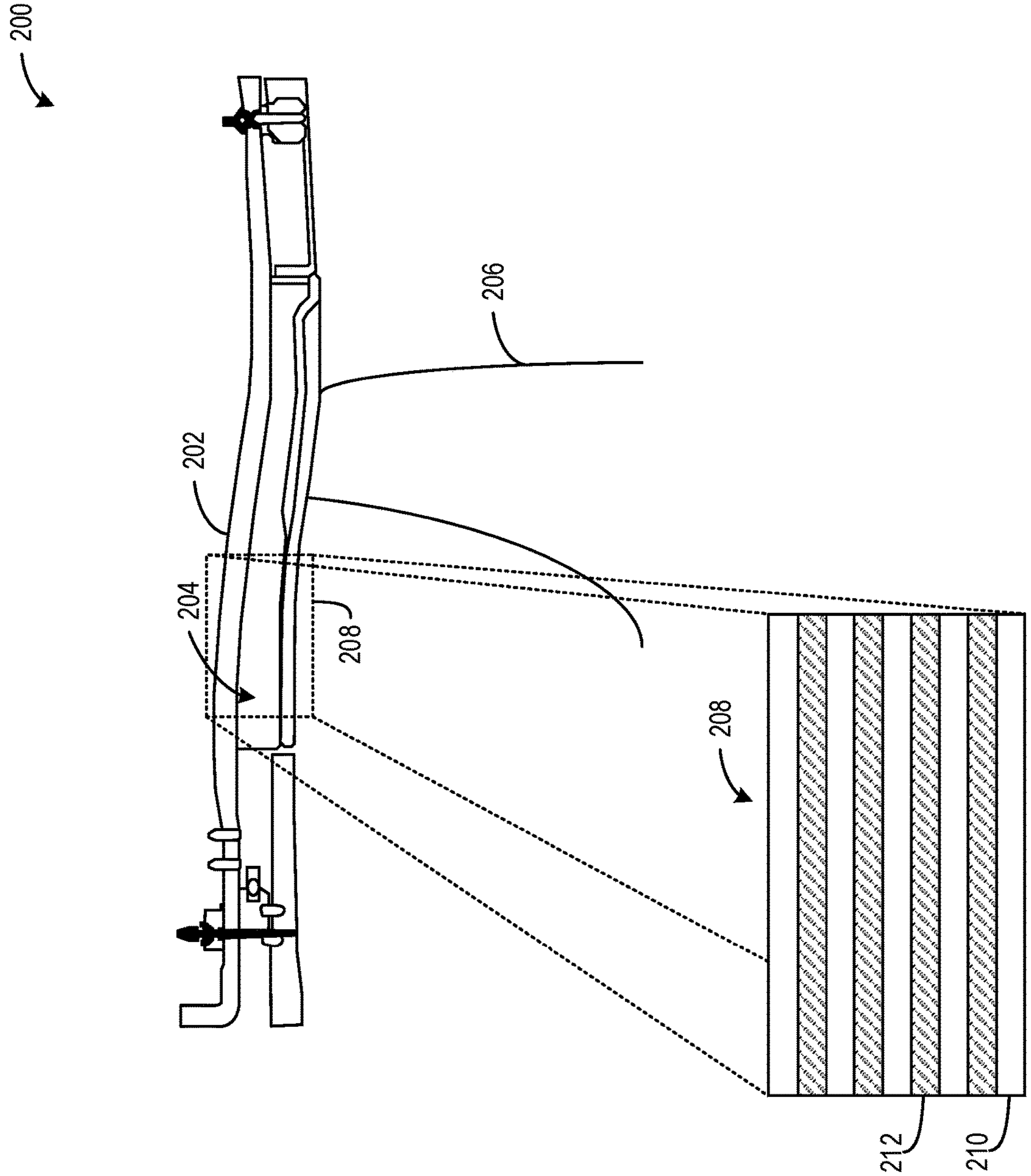
FIG. 2 illustrates an example containment casing and/or trench filler of a turbofan engine.

FIG. 2 illustrates a portion of a turbofan engine (e.g., an aircraft engine, a gas turbine engine, a turbojet engine, etc.) 200. In FIG. 2, the turbofan engine 200 includes a containment casing 202, a trench filler 204, and a fan blade 206. In FIG. 2, the containment casing 202 and/or the trench filler 204 can be utilized as a hard or soft wall containment casing (e.g., the containment casing 134), a turbocharger containment casing, and/or a compressor and/or turbine casing (e.g., the outer casing 108) positioned internal to the containment casing 202 and trench filler 204. In some examples, the containment casing 202 and/or the trench filler 204 are produced via additive manufacturing (e.g., three-dimensional (3-D) printing).

The illustrated example of FIG. 2 includes a magnified view 208 of the containment casing 202 and/or the trench filler 204. In FIG. 2, the containment casing 202 and/or the trench filler 204 include an alternating first layer 210 and second layer 212. In FIG. 2, the first layer 210 includes a solid metal, such as a sheet or plate of aluminum, aluminum-lithium, titanium, and/or steel, etc. In some examples, an interior surface of the first layer 210 includes an abradable coating to prevent wear from friction caused by the rotation of a plurality of the fan blade 206.

In FIG. 2, the second layer 212 includes a lattice structure (e.g., a gyroid structure), air, and/or fluid (e.g., a Newtonian fluid or a non-Newtonian fluid). In some examples, the second layer 212 includes the air and/or fluid to minimize a weight and/or a cost of the containment casing 202 and/or the trench filler 204. In such examples, a geometry (e.g., a thickness, a quantity of layers, an orientation, a spacing, etc.) of the first layer 210 can provide a stiffness to the containment casing 202. In some examples, the second layer 212 includes the lattice structure to control a stiffness and/or a weight of the containment casing 202 and/or the trench filler 204. In such examples, properties (e.g., a size, a density, a volume fraction, etc.) of the lattice structure can tailor the stiffness and/or the weight based on an area of implementation, as discussed further in association with FIG. 3.

In FIG. 2, the containment casing 202 and/or the trench filler 204 contain the fan blade 206 and/or fragments thereof when an FBO event occurs. In FIG. 2, the second layer 212 provides the containment casing 202 and/or the trench filler 204 with energy absorption capabilities. In some examples, the gyroid structure provides greater energy absorption compared to a solid metal plate and/or a conventional honeycomb. As a result, the containment casing 202 and/or the trench filler 204 absorbs more kinetic energy from the loose fan blade 206 and/or fragments thereof than the containment casing 134 of FIG. 1, which reduces damage to the turbofan engine 200 when an FBO event occurs.

Figure 3:
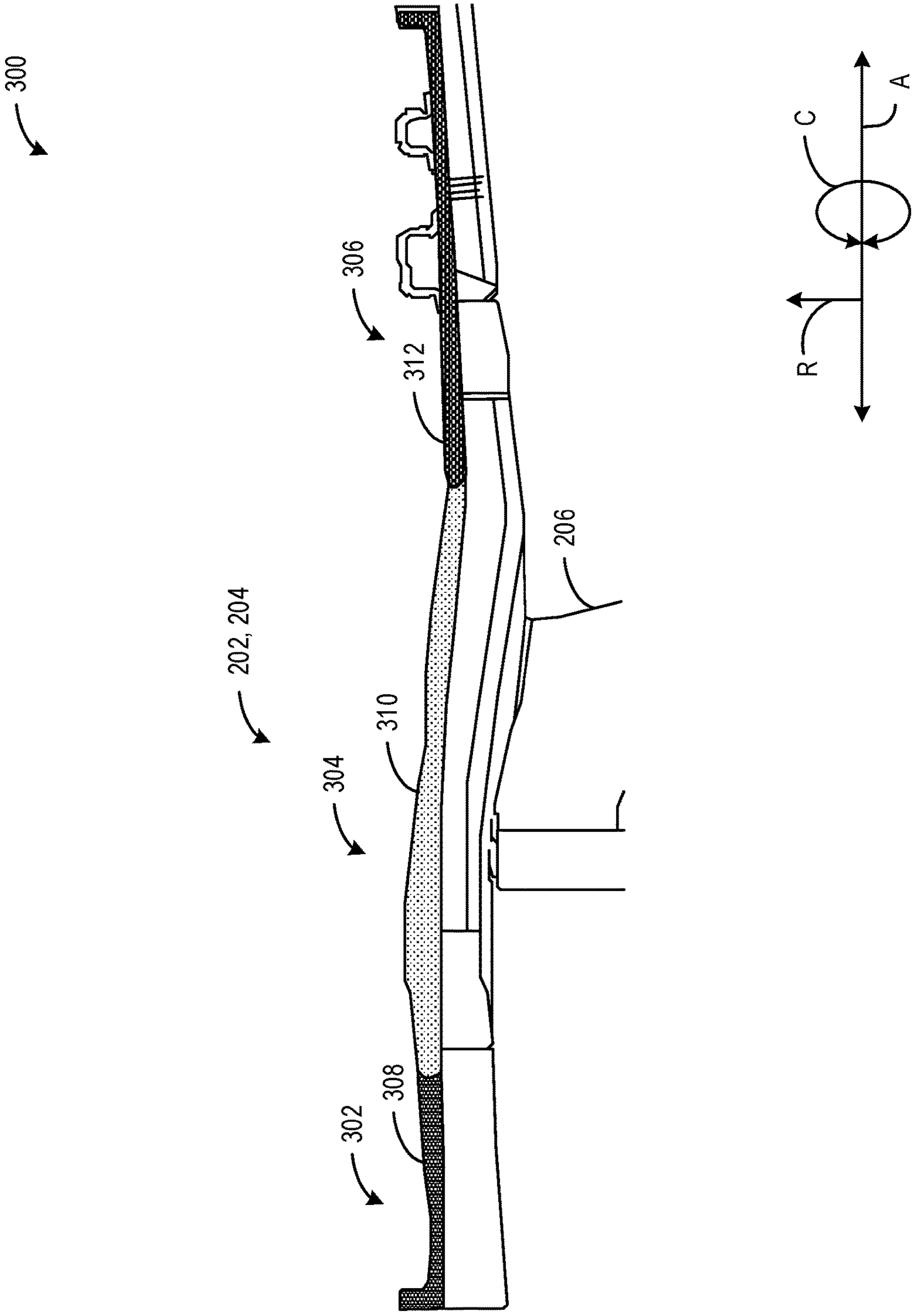
FIG. 3 illustrates an example configuration of the example containment casing and/or trench filler of FIG. 2.

FIG. 3 illustrates an example configuration 300 of the example containment casing 202 and/or the trench filler 204 of FIG. 2. In FIG. 3, the containment casing 202 and/or the trench filler 204 includes a first section (also referred to as a leading section or a fore portion, for example) 302, a second section (also referred to as a fan blade section or an intermediate portion, for example) 304, and a third section (e.g., a trailing section, an aft portion) 306. In FIG. 3, the second section 304 is positioned between the first section 302 and the third section 306. The illustrated example further includes the fan blade 206 of FIG. 2. In FIG. 3, the second section 304 traverses a plane of rotation of the fan blade 206.

In FIG. 3, the first section 302 includes a first gyroid structure 308, the second section 304 includes a second gyroid structure 310, and the third section includes a third gyroid structure 312. In FIG. 3, the first gyroid structure 308 includes a higher volume fraction than the third gyroid structure 312 to account for different loads the first and third sections 302, 306 encounter. Specifically, the higher volume fraction of the first gyroid structure 308 implements a higher bending stiffness than the third gyroid structure 312 to account for higher loads that the first section 302 encounters compared to the third section 306. In some other examples, the first gyroid structure 308 and the third gyroid structure 312 include a same volume fraction. In FIG. 3, the volume fraction of the first gyroid structure 308 and the third gyroid structure 312 tailors a stiffness of the containment casing 202.

In FIG. 3, the second gyroid structure 310 includes a lower volume fraction than the first gyroid structure 308 and the third gyroid structure 312. As such, the second section 304 can provide greater energy absorption than the first section 302 and the third section 306 when an FBO event occurs. Accordingly, the energy absorption provided by the second section 304 minimizes or otherwise reduces occurrences of the loose fan blade 206 and/or fragments thereof deflecting off the trench filler 204 and/or the containment casing 202 with a kinetic energy that would damage components of the turbofan, such as the core turbine engine 104 of FIG. 1. In turn, the second section 304 prevents and/or otherwise reduces damage to other components of the turbofan engine 200. Accordingly, the trench filler 204 and/or containment casing 202 enables energy absorption via the second section 304 while maintaining structural support via the first section 302 and the third section 306. As such, the containment casing 202 and/or the trench filler 204 can provide an improved energy absorption compared to some known hard wall containment casings (e.g., the containment casing 134 of FIG. 1) when an FBO event occurs.

Figure 4A:
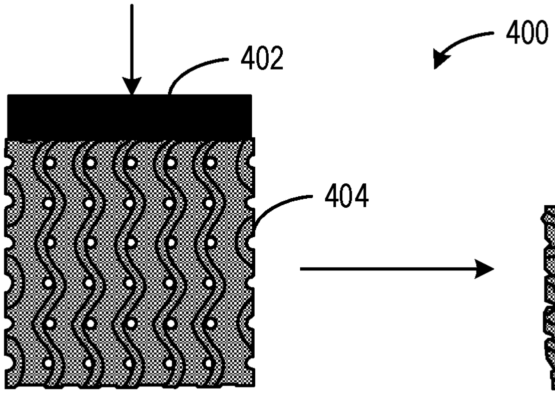
FIGS. 4A-F illustrate example impact load simulations of the example containment casing and/or trench filler of FIGS. 2 and/or 3 and a containment casing of the prior art example turbofan engine of FIG. 1.
Figure 4B:
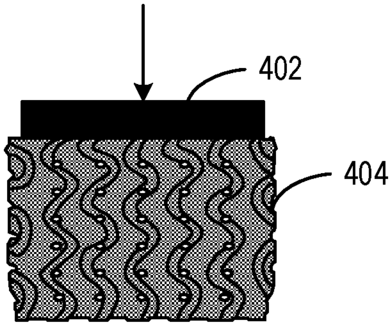

FIGS. 4A-B illustrate a first impact load simulation 400 including an example impact load 402 that the containment casing 202 and/or the trench filler 204 encounters when an FBO event occurs. FIG. 4A illustrates a gyroid structure (e.g., the first gyroid structure 308, the second gyroid structure 310, the third gyroid structure 312) 404 of the containment casing 202 and/or the trench filler 204 of FIGS. 2 and/or 3 prior to encountering an impact load (e.g., an FBO event impact load) 402. FIG. 4B illustrates the gyroid structure 404 after encountering the impact load 402. In FIGS. 4A-B, the gyroid structure 404 compresses to absorb the impact load 402 and, thus, kinetic energy from a fan blade (e.g., the fan blade 206) and/or fragments thereof when an FBO event occurs. Accordingly, the compression of the gyroid structure 404 prevents and/or otherwise reduces damage to other components of the turbofan engine 200 that can result from a deflection of the fan blade and/or fragments thereof off the containment casing 202 and/or the trench filler 204.

In FIG. 4B, the compression of the gyroid structure 404 limits damages on the containment casing 202 and/or the trench filler 204, which maintains a structure thereof. In turn, the containment casing 202 and/or the trench filler 204 can maintain a stiffness of the turbofan engine 200 to prevent further issues from arising as a result of damage from the FBO event. In some examples, the fan blade 206 or fragments thereof is/are lodged into the gyroid structure 404 during the FBO event. As such, the gyroid structure 404 minimizes or otherwise reduces damages that the turbofan engine encounters when the FBO event occurs.

Figure 4C:
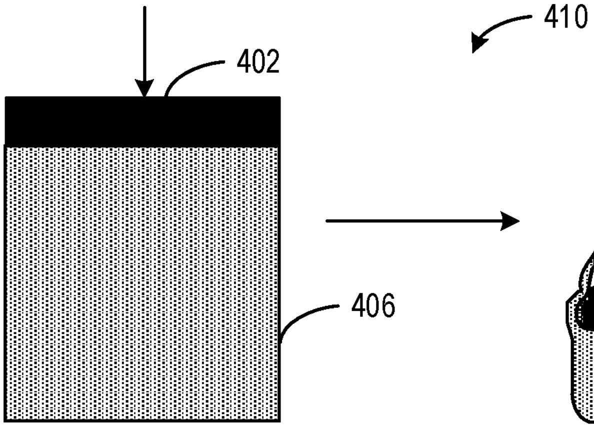
Figure 4D:
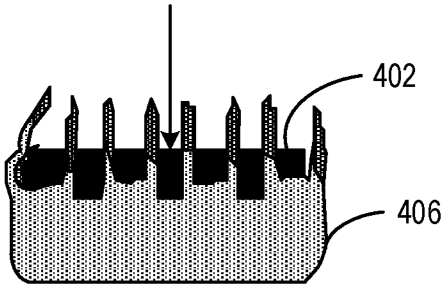

FIGS. 4C-D illustrate a second impact load simulation 410. FIG. 4C illustrates a honeycomb structure 406 of the containment casing 134 of the prior art example aircraft engine 100 of FIG. 1 prior to encountering the impact load 402. FIG. 4D illustrates the honeycomb structure 406 after encountering the impact load 402. In FIG. 4D, the honeycomb structure 406 absorbs less energy from the impact load 402 than the gyroid structure 404 of FIGS. 4A-B. In FIG. 4D, the impact load 402 causes the honeycomb structure 406 to rupture and/or deform significantly. Accordingly, a fan blade (e.g. the plurality of fan blades 132 of FIG. 1) or fragments thereof may pass through the honeycomb structure 406 and damage components associated with the aircraft engine 100 that are external to the outer casing 108. In addition, fragments of the honeycomb structure 406 may break off as a result of the impact load 402 and cause further damage to the aircraft engine 100. In some examples, the deformation of the honeycomb structure 406 reduces a stiffness of the containment casing 134, which can cause the containment casing 134 to break in response to encountering a load.

Figure 4E:
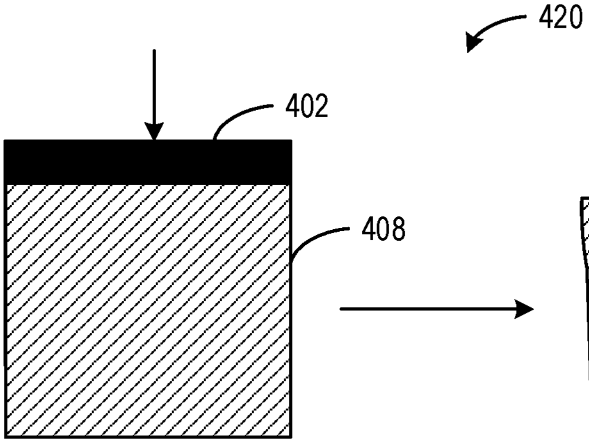
Figure 4F:
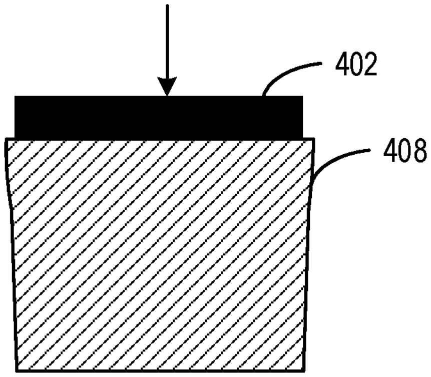

FIGS. 4E-F illustrate a third impact load simulation 420. FIG. 4E illustrates a solid metal structure 408 of the containment casing 134 of the prior art example aircraft engine 100 of FIG. 1 prior to encountering the impact load 402. FIG. 4F illustrates the solid metal structure 408 after encountering the impact load 402. In FIG. 4F, the solid metal structure 408 encounters minimal compression from the impact load 402. As a result, the solid metal structure 408 absorbs less energy from the impact load 402 than the gyroid structure 404. Accordingly, when the FBO event occurs the solid metal structure 408 deflects the loose fan blade (e.g. the plurality of fan blades 132 of FIG. 1) and/or fragments thereof without significantly absorbing kinetic energy from the impact, which enables the loose fan blade and/or fragments thereof to damage other components of the aircraft engine 100, such as the core turbine engine 104.

Figure 5:
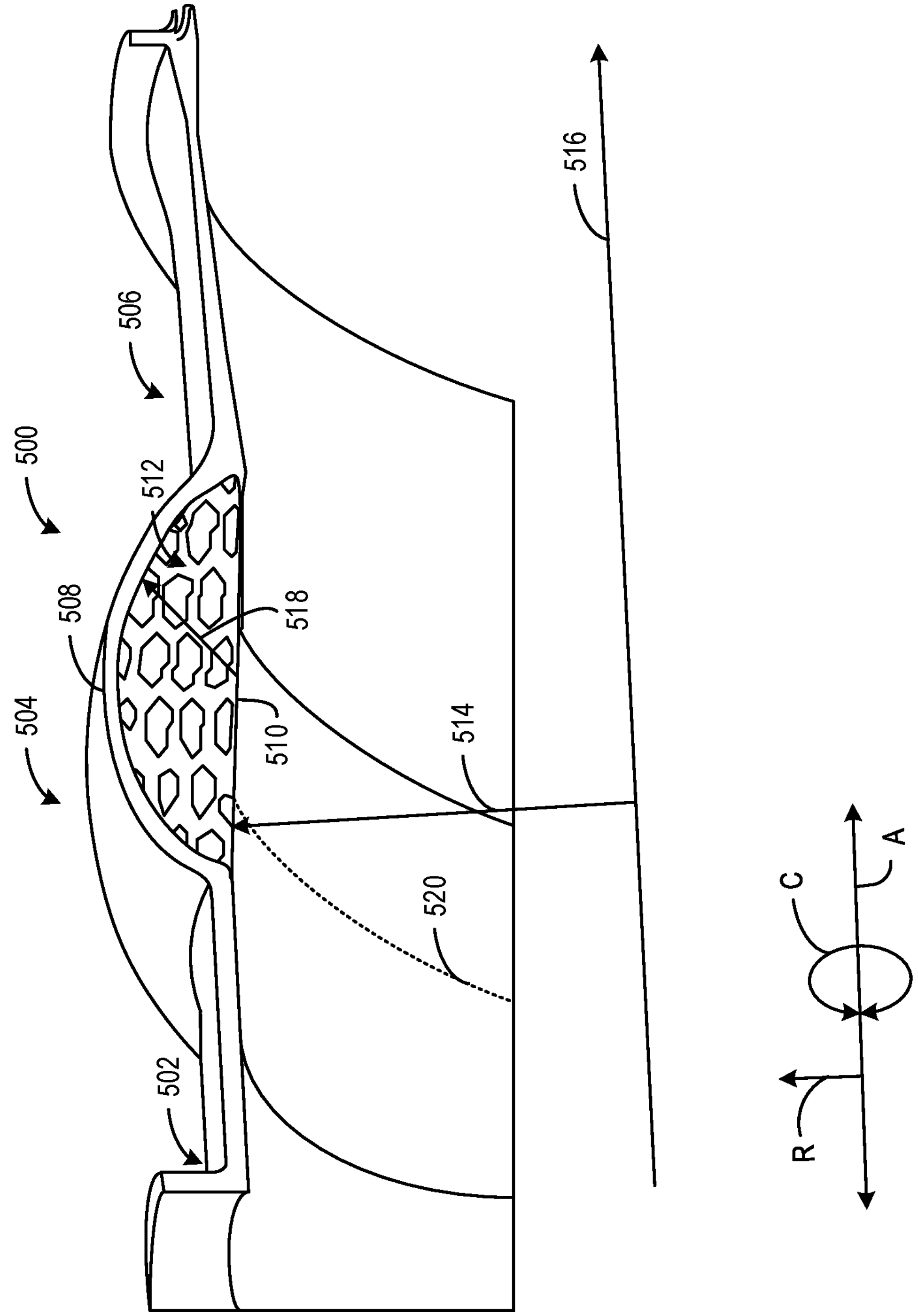
FIG. 5 illustrates an example sectional view of an example containment casing of a turbofan engine.

FIG. 5 illustrates an example sectional view of a containment casing 500 of a turbofan engine. The containment casing 500 can be utilized as an advantageous replacement for the containment casing 134 of the turbofan engine 100 of FIG. 1. In addition, the containment casing 500 can be utilized as the containment casing 202 of FIGS. 2 and/or 3. In FIG. 5, the containment casing 500 includes a first portion (e.g., a leading portion) 502, a second portion (e.g., a protruding portion, a bubble portion, an intermediate portion) 504, and a third portion (e.g., a trailing portion) 506. In FIG. 5, the protruding portion 504 includes an outer wall 508, an inner wall 510, and a structural lattice 512. In FIG. 5, the containment casing 500 includes a first radius 514 extending from a rotational axis 516 of fan blades (e.g., the fan blade 206) to an interior surface of the containment casing 500 (e.g., an interior surface of the inner wall 510).

In FIG. 5, the protruding portion 504 includes a second radius 518 extending from a center 520 of the inner wall 510 to the outer wall 508.

In FIG. 5, the protruding portion 504 circumferentially surrounds the fan blades (e.g., the fan blades 132 of FIG. 1, the fan blade 206 of FIG. 2) of the turbofan engine. In some examples, one or more of the protruding portion 504 aligns with one or more fans. In FIG. 5, the protruding portion 504 includes curvature in two geometric planes (e.g., in the circumferential direction C and the axial direction A). In FIG. 5, the inner wall 510 is an abradable layer that prevents wear that would otherwise be caused by friction from a rotation of the fan blades. In FIG. 5, the outer wall 508 includes a first thickness and the inner wall 510 includes a second thickness. In some examples, the second thickness is thinner than the first thickness.

In FIG. 5, the structural lattice 512 is positioned between the outer wall 508, and the inner wall 510. In some examples, the structural lattice 512 includes a gyroid structure (e.g., the second gyroid structure 310). In FIG. 5, the structural lattice 512 provides the containment casing 500 with energy absorption capabilities. In some examples, when an FBO event occurs, a loose fan blade and/or fragments thereof penetrate the inner wall 510 and impact the structural lattice 512. In such examples, the structural lattice 512 can absorb the impact and contain the loose fan blade and/or fragments thereof to protect other components of the turbofan engine. The structural lattice 512 includes a significant density to preclude the loose fan blade and/or portions thereof from exiting the protruding portion 504 and damaging other components of the turbofan engine. In some examples, when fragments of the loose fan blade penetrate a leading or trailing area (e.g., a shallower portion) of the structural lattice 512 with enough kinetic energy to impact the outer wall 508, a curvature of the outer wall 508 deflects the fragments into another portion of the structural lattice 512, which, in turn, contains the fragments to protect components of the turbofan engine. In some examples, an inner portion of the structural lattice 512 includes a first volume fraction and an outer portion of the structural lattice 512 includes a second volume fraction less than the first volume fraction. In such examples, the inner portion of the structural lattice 512 provides the containment casing 500 with impact absorption capabilities, containment capabilities, and an additional structural stiffness.

In FIG. 5, the containment casing 500 is a hard wall containment casing that provides the advantages of a soft wall containment casing. For example, in FIG. 5, the structural lattice 512 provides energy absorption capabilities and a stiffness to the containment casing 500. As a result of the stiffness provided by the structural lattice 512, a thickness of the first portion 502 and the second portion 506 of the containment casing 500 can be reduced relative to a thickness of the containment casing 134 of FIG. 1. In turn, the protruding portion 504 provides protection to the turbofan engine while maintaining a desired weight and/or stiffness of the containment casing 500. In some examples, the protruding portion 504 is integrated into an existing containment casing via joining methods.

Figure 6:
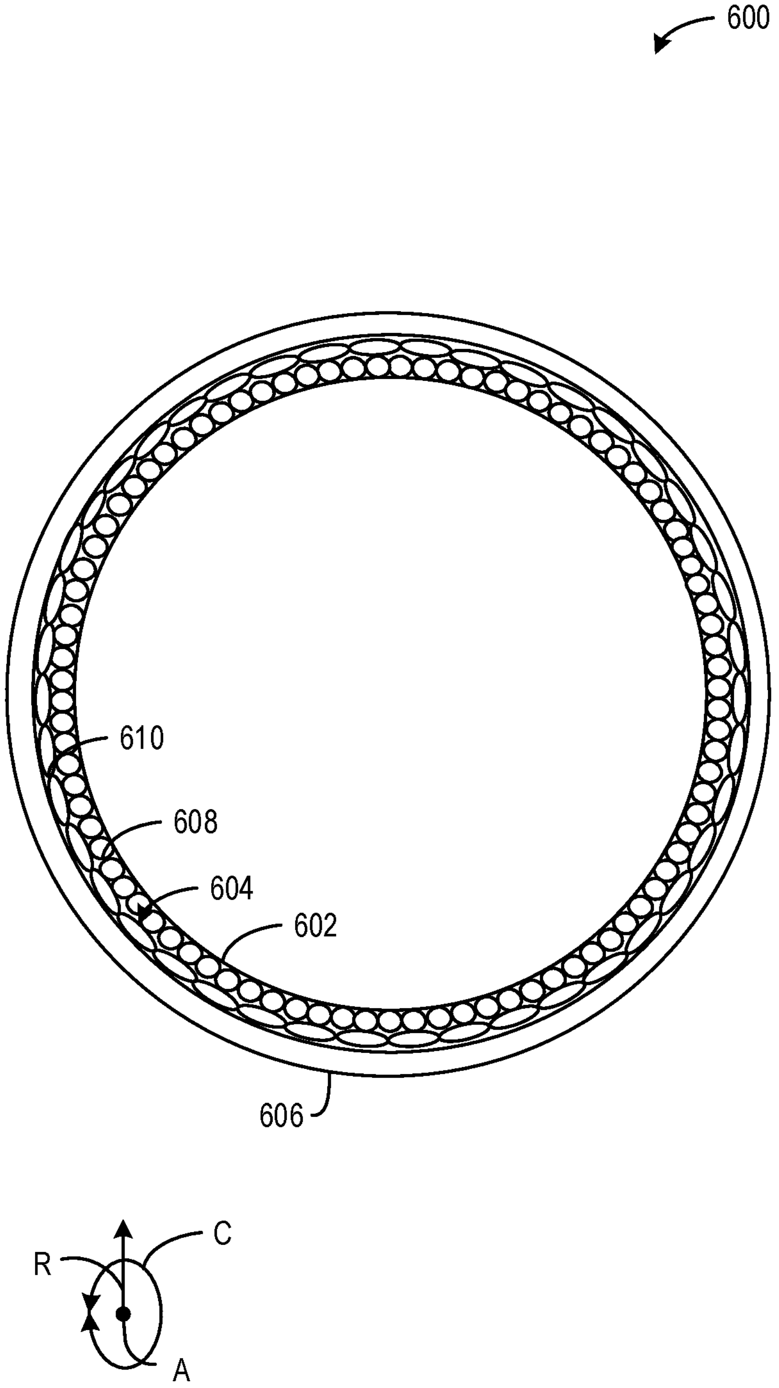
FIG. 6 illustrates an example axial cross-sectional view of the example containment casing and/or trench filler of the turbofan engine of FIGS. 2, 3, and/or 5.

FIG. 6 illustrates a volume fraction and/or density configuration of a containment casing and/or trench filler 600. The volume fraction and/or density configuration of the containment casing and/or trench filler 600 can be utilized in the containment casing 202 and/or the trench filler 204 of FIGS. 2 and 3, and/or the structural lattice 512 of FIG. 5. In FIG. 6, the containment casing and/or trench filler 600 includes an abradable layer 602, a lattice structure (e.g., the first, second, and/or third gyroid structure 302, 304, 306, the structural lattice 512) 604, and a casing 606. In FIG. 6, the lattice structure 604 includes a first layer (e.g., an inner layer) 608 and a second layer (e.g., an outer layer) 610.

In FIG. 6, the casing 606 surrounds the second layer 610 of the lattice structure 604. In FIG. 6, the second layer 610 surrounds the first layer 608 of the lattice structure 604. In FIG. 6, the abradable layer 602 is positioned internal to the lattice structure 604 to prevent the lattice structure from encountering wear due to a rotation of fan blades (e.g., the fan blade 206).

In FIG. 6, the lattice structure 604 provides the containment casing and/or trench filler 600 with energy absorption capabilities to minimize and/or otherwise reduce damage from an FBO event. In FIG. 6, the first layer 608 includes a first volume fraction and/or density. In FIG. 6, the second layer 610 includes a second volume fraction and/or density, which is less than the first volume fraction and/or density. In FIG. 6, the first layer 608 provides initial impact absorption of a loose fan blade and/or fragments thereof. In such examples, the second layer 610 provides additional impact absorption to prevent the loose fan blade and/or fragments thereof from exiting, and/or causing further damage to components within, the containment casing and/or the trench filler 600. Accordingly, the lower volume fraction and/or density of the second layer 610 provides energy absorption while minimizing and/or otherwise reducing a weight of the lattice structure and, thus, the containment casing and/or trench filler 600.

In FIG. 6, the lattice structure 604 is produced through additive manufacturing, which enables properties (e.g., a structure, a stiffness, a weight, a volume fraction, a density, etc.) of the lattice structure 604 to correspond to an area of implementation within the containment casing and/or trench filler 600. As a result, the lattice structure 604 can be manufactured based on requirements (e.g., a creep, a fatigue, an elongation, etc.) specific to certain areas of the containment casing and/or trench filler 600.

Figure 7A:
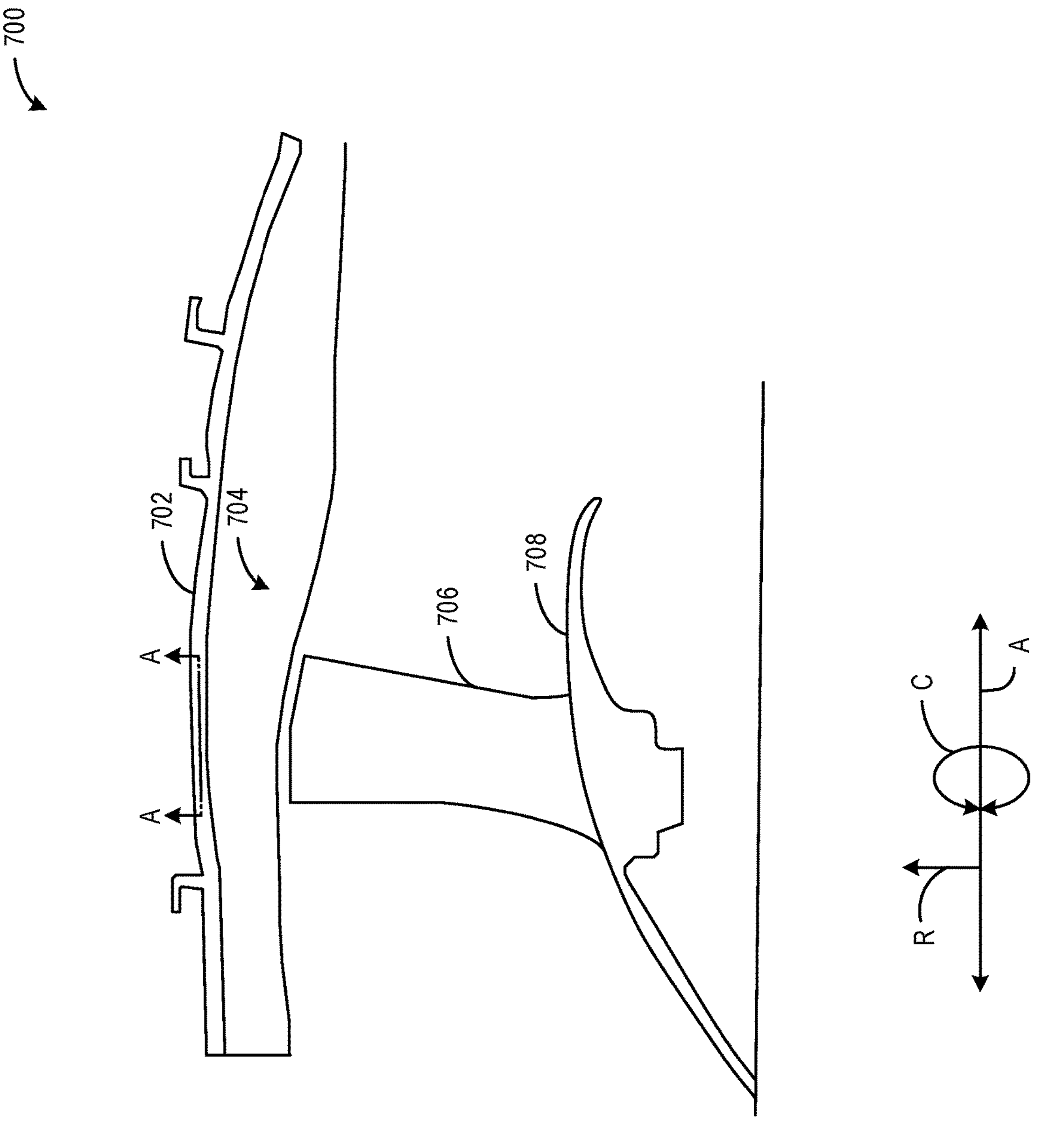
FIGS. 7A-B illustrate a portion of an example containment casing of a turbofan engine.

FIG. 7A illustrates a portion of a turbofan engine 700. In FIG. 7A, the turbofan engine 700 includes a containment casing 702, a trench filler 704, a fan blade 706, and a retention disc 708. In FIG. 7A, the trench filler 704 is coupled to an internal surface of the containment casing 702. In some examples, the trench filler 204 of FIG. 2 is utilized as the trench filler 704. In FIG. 7A, the fan blade 706 is coupled to the retention disc 708. In FIG. 7A, during operations of the turbofan engine 700 the retention disc 708 rotates causing the fan blade 706 to rotate.

Figure 7B:
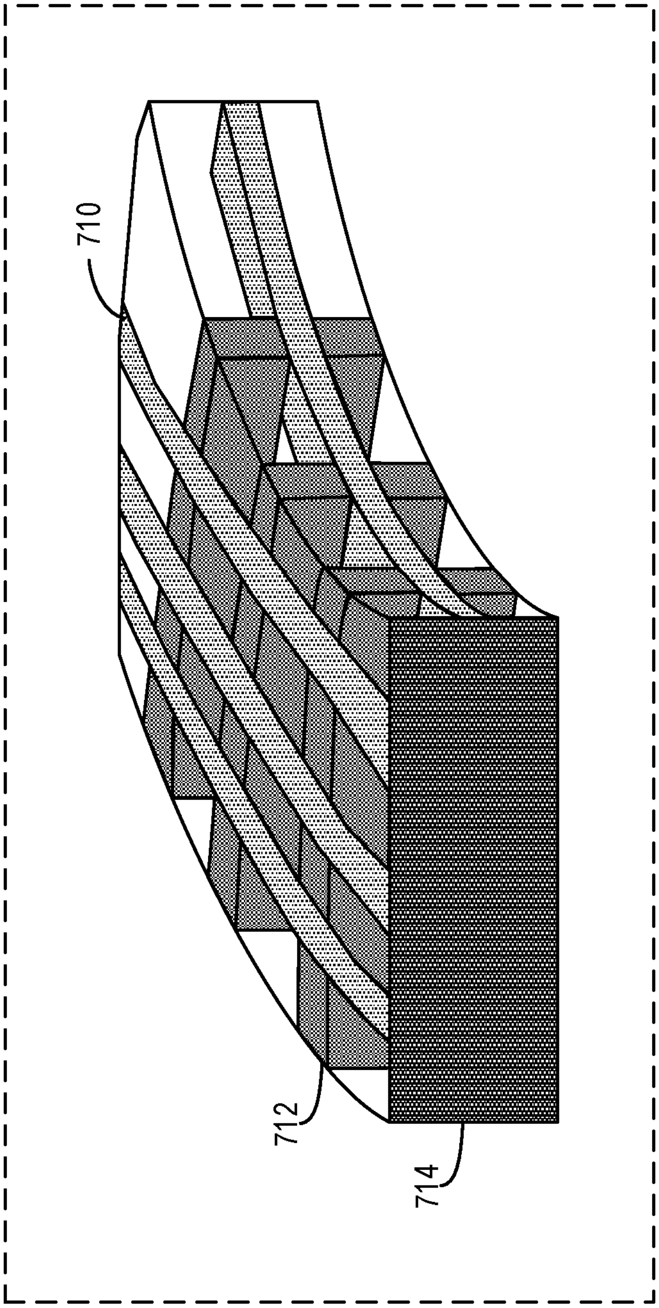

In FIG. 7A, the containment casing 702 includes a truss and/or ribbed structure, as discussed further in association with FIG. 7B. In some examples, the truss and/or ribbed structure of the containment casing 702 includes a hybrid construction of at least two different metals, such as aluminum-lithium and aluminum. For example, the containment casing 702 can include bands of aluminum-lithium positioned between aluminum walls. In some examples, the containment casing 702 includes a monolithic construction of the bands of aluminum-lithium internal to aluminum-lithium walls. Aluminum-lithium provides a higher impact toughness than aluminum at the same density. Accordingly, the containment casing 702 can utilize less aluminum-lithium to provide the same containment capabilities as an aluminum casing, which results in a reduced weight of the containment casing 702. As such, the turbofan engine 700 can be supported with less supporting materials and/or structures, which results in significant cost savings. In some examples, the containment casing 702 can be a similar weight to a soft wall, composite fan case. In such examples, the containment casing 702 can replace the soft wall, composite fan case at a significantly reduced cost while providing improved containment capabilities.

In some examples, when the turbofan engine 700 ingests a foreign object, the object strikes the fan blade 706 and/or the retention disc 708 causing the fan blade 706 and/or fragments thereof to separate from the retention disc 708 (e.g., an FBO event occurs). In FIG. 7A, a rotational velocity of the fan blade 706 causes the fan blade 706 and/or fragments thereof to be launched on an outward trajectory toward the trench filler 704 and the containment casing 702. In FIG. 7A, when the FBO event occurs the high impact toughness of the containment casing 702 prevents the fan blade 706 and/or fragments thereof from exiting the turbofan engine 700 and damaging external components.

FIG. 7B illustrates a top-down view of a cross-section A-A of the containment casing 702 of FIG. 7A. In FIG. 7B, the containment casing 702 includes a first set of metal bands 710, a second set of metal bands 712, and a wall 714. In some examples, the first and second sets of metal bands 710, 712 form an interior structure of the containment casing 702. Further, a plurality of the wall 714 surrounds the first and second sets of metal bands 710, 712. In FIG. 7B, the first set of metal bands 710, the second set of metal bands 712, and the plurality of the wall 714 are coupled via joining methods. In FIG. 7B, the first set of metal bands 710, the second set of metal bands 712, and the wall 714 include aluminum-lithium. In some examples, certain areas of the containment casing 702 include the first and second sets of metal bands 710, 712 to provide energy absorption and prevent the fan blade 706 and/or fragments thereof from exiting the containment casing 702.

In FIG. 7B, the first set of metal bands 710 traverse the second set of metal bands 712. In some examples, the first set of metal bands 710 are positioned on a same plane or level as the second set metal bands 712. In some examples, the first set of metal bands 710 and the second set of metal bands 712 form alternating layers within the containment casing 702. In some examples, the first and second sets of metal bands 710, 712 are positioned along an inner circumference and/or an outer circumference of the containment casing 702 for energy absorption and containment during an FBO event. The first set of metal bands 710 and the second set of metal bands 712 can include various lengths, widths, and/or thicknesses based on an area of implementation within the containment casing 702. In FIG. 7B, a structural layout of the first and second sets of metal bands 710, 712 is configurable. For example, an angular orientation of the first set of metal bands 710 relative to the second set of metal bands 712, a spacing between the bands 710, 712, a quantity of the bands 710, 712, and/or a quantity of layers the bands 710, 712 form, can be configured based on the turbofan engine 700 and/or an area of implementation within the containment casing 702.

Figure 8A:
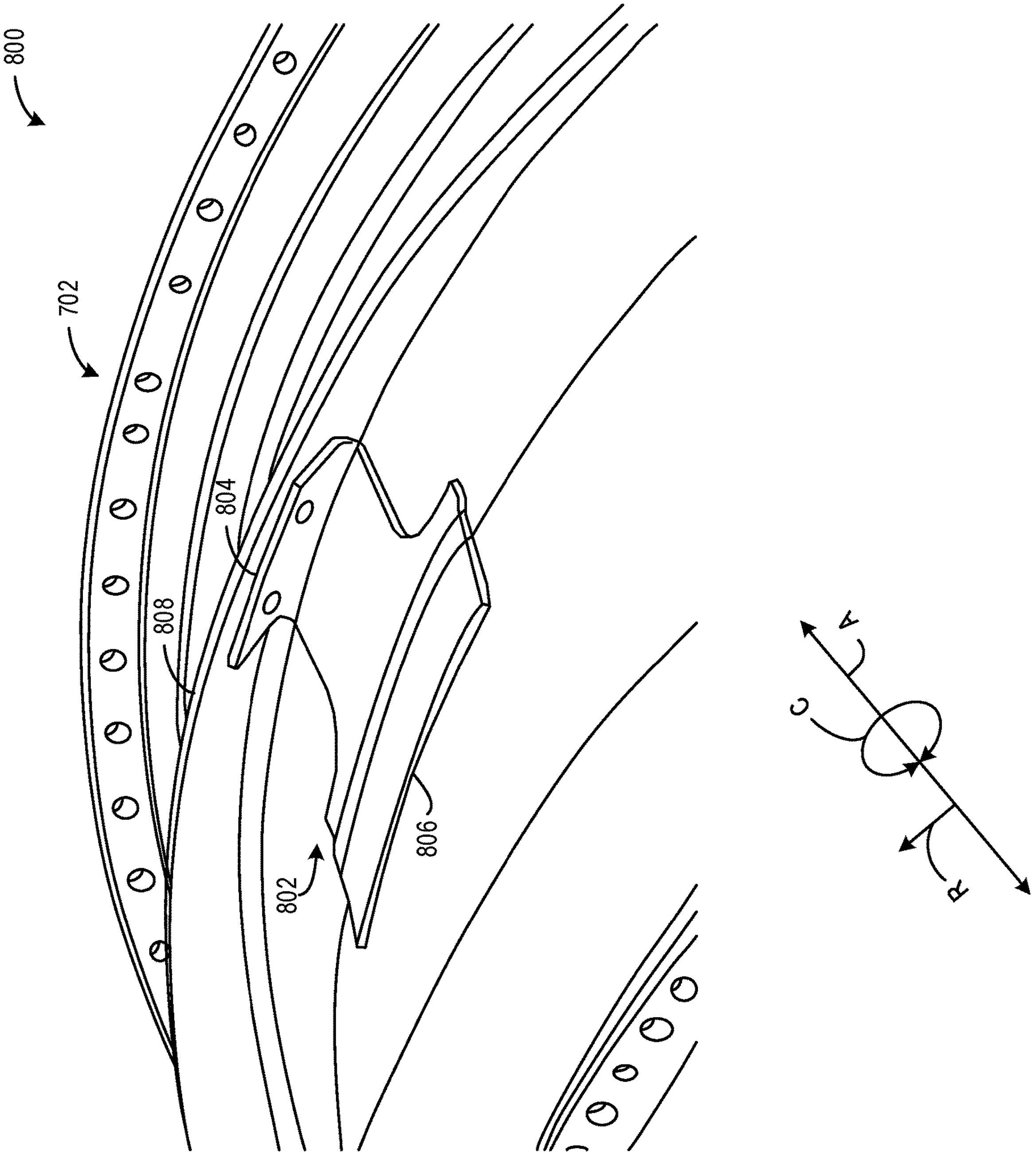
FIGS. 8A-B illustrate an example deflector plate of the example containment casing of the turbofan engine of FIGS. 7A-B.

FIG. 8A illustrates a first implementation 800 of a deflector plate 802 in the turbofan engine 700 of FIGS. 7A-B. In FIG. 8A, the deflector plate 802 includes a first end 804 and a second end 806. In addition, FIG. 8A includes a ridge 808 on an exterior surface of the containment casing 702 of FIGS. 7A-B. Although the deflector plate 802 is utilized with the containment casing 702 of FIGS. 7A-B in this example, the deflector plate 802 can be utilized with any containment casing to protect components associated with a turbofan engine. In some examples, the deflector plate 802 provides protection to components external to a soft wall containment casing with a minimal weight impact.

In FIG. 8A, the first end 804 of the deflector plate 802 is coupled the ridge 808 of the containment casing 702. For example, the first end 804 can be bolted to the ridge 808. In some examples, the deflector plate 802 is integrally formed with the ridge 808. For example, the deflector plate 802 can be manufactured with the containment casing 702 via raised boss milling. In FIG. 8A, the second end 806 of the deflector plate 802 is separate (e.g., unengaged, uncoupled, detached, etc.) from the containment casing 702.

In FIG. 8A, the deflector plate 802 is positioned along a portion of the exterior surface of the containment casing 702. In some examples, the deflector plate 802 aligns with components associated with the turbofan engine 700 positioned outside the containment casing 702, such as gearboxes and/or a FADEC, for example, to provide protection. In FIG. 8A, when the fan blade 706 releases from the retention disc 708 and launches through the containment casing 702, the deflector plate 802 deflects and reduces a velocity of the fan blade 706 and/or fragments thereof. In some examples, the deflector plate 802 refrains from fully inhibiting a trajectory of the fan blade 706 as only the first end 804 is coupled to the containment casing 702 and the deflector plate 802 is only positioned across a portion of the exterior surface of the containment casing 702. As such, the deflector plate 802 deflects the fan blade 706 and/or fragments thereof away from the components associated with the turbofan engine 700 positioned outside the containment casing 702 without deflecting the fan blade 706 and/or fragments thereof back into the turbofan engine 700 to avoid further damage from the FBO event.

In some examples, the deflector plate 802 is utilized with a soft wall containment casing in which case the fan blade 706 and/or fragments thereof would be more likely to encounter the deflector plate 802 as the soft wall containment casing provides reduced containment capabilities compared to the containment casing 702 of FIGS. 7A-B and 8A. In some examples, a thickness and/or a material of the deflector plate 802 is configured to deflect and reduce a velocity and, in turn, prevent and/or otherwise minimize or reduce an impact force of the fan blade 706 on a structure associated with the turbofan engine 700. For example, when the deflector plate 802 is utilized with the soft wall containment casing, the deflector plate 802 can include a more dense and stronger ductile material than the soft wall containment casing, which protects components external to the soft wall containment casing akin to hard wall containment casings at a reduced weight compared to some hard wall containment casings. In some examples, additional structures are incorporated along the external surface of the containment casing 702 with the deflector plate 802 to contain the fan blade 706 and/or fragments thereof when an FBO event occurs, as discussed further in association with FIG. 8B.

Figure 8B:
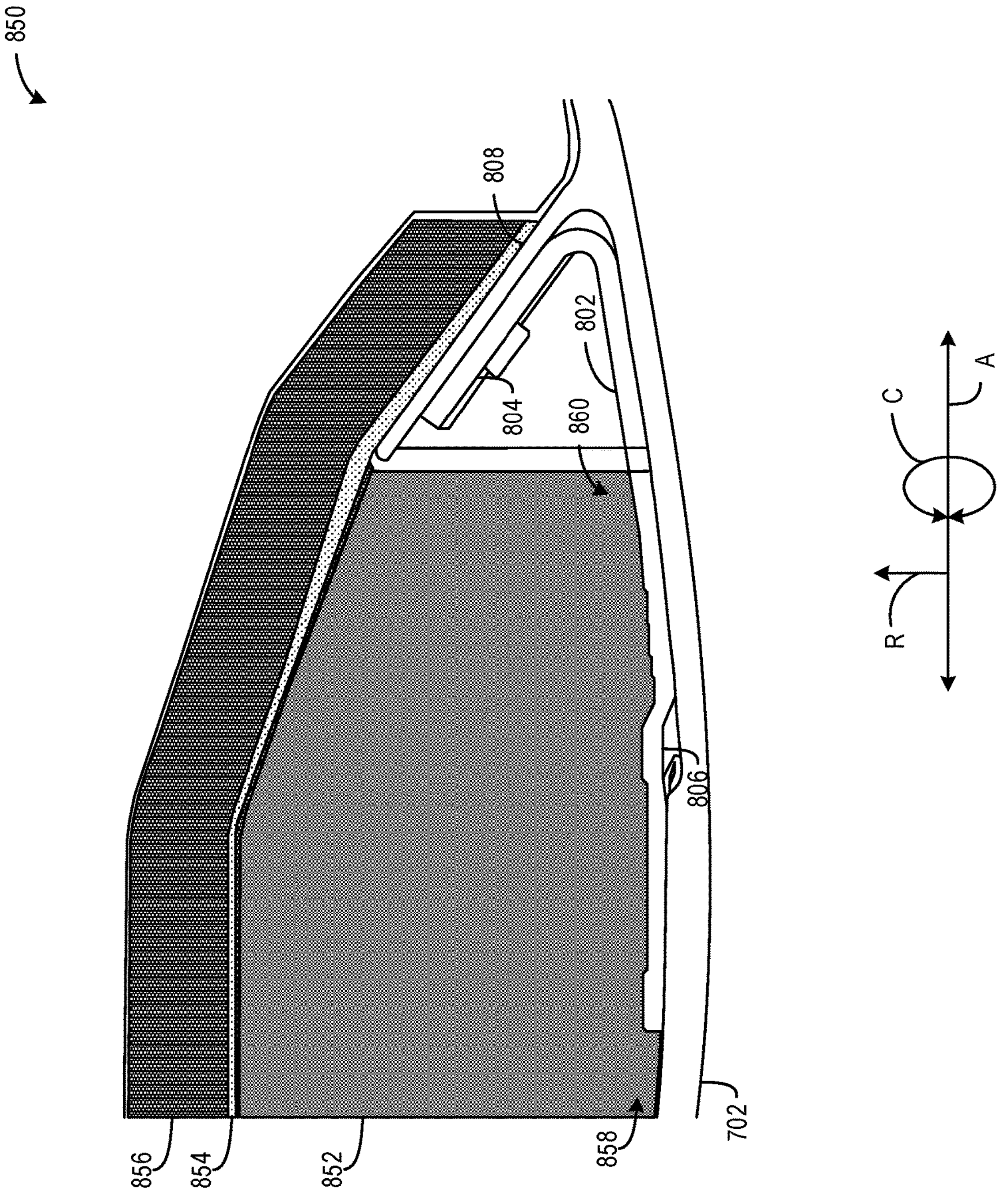

FIG. 8B illustrates a second implementation 850 of the deflector plate 802 in the turbofan engine 700 of FIGS. 7A-B. In FIG. 8B, the second implementation 850 includes an energy absorbing layer (e.g., a lattice structure, a honeycomb structure, etc.) 852, a cover layer (e.g., a metal sheet, a composite sheet) 854, and a wrap layer (e.g., a Kevlar™ wrap) 856. FIG. 8B further includes the deflector plate 802 and the ridge 808 of FIG. 8A and the containment casing 702 of FIGS. 7A-B and 8A.

In FIG. 8B, the first end 804 of the deflector plate 802 is coupled to the ridge 808 of the containment casing 702. In FIG. 8B, a first portion 858 of the energy absorbing layer 852 is positioned on an exterior surface of the containment casing 702 and a second portion 860 of the energy absorbing layer 852 is positioned on an exterior surface of the second end 806 of the deflector plate 802. In FIG. 8B, the cover layer 854 is positioned above the energy absorbing layer 852. In FIG. 8B, the cover layer 854 is coupled to the exterior surface of the containment casing 702. In FIG. 8B, the wrap layer 856 is positioned above the cover layer 854 and coupled to the containment casing 702. In FIG. 8B, the energy absorbing layer 852, the cover layer 854, and the wrap layer 856 are positioned on a portion of the containment casing 702 with the deflector plate 802.

In FIG. 8B, the energy absorbing layer 852 includes a thickness that enables absorption and/or containment of the fan blade 706 and/or fragments thereof when an FBO event occurs. In FIG. 8B, the cover layer 854 maintains a position of the energy absorbing layer 852. In FIG. 8B, the wrap layer 856 contains the fan blade 706 and/or fragments thereof within the energy absorbing layer 852. For example, when an FBO event occurs, the deflector plate 802 can provide energy absorption and deflect the fan blade 706 and/or fragments thereof into the energy absorbing layer 852. Accordingly, the energy absorbing layer 852 further absorbs kinetic energy from the fan blade 706 and/or fragments thereof. Further, the cover layer 854 maintains a position of the energy absorbing layer 852 as the fan blade 706 and/or fragments thereof travel therethrough. In turn, the wrap layer 856 deflects the fan blade 706 and/or any fragments thereof that reach the cover layer 854 and/or the wrap layer 856 back into the energy absorbing layer 852 for additional energy absorption and, in turn, containment. As such, the deflector plate 802, the energy absorbing layer 852, the cover layer 854, and/or the wrap layer 856 reduce and/or otherwise minimize damage from the FBO event.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that provide light weight fan casing configurations for energy absorption. More specifically, the examples described herein provide containment casings, trench fillers, and/or structures associated therewith that protect a turbofan engine when an FBO event occurs. In addition, the examples disclosed herein minimize a weight impact of the protection provided by the containment casings, trench fillers, and/or associated structures to reduce a weight of the turbofan engine and, in turn, minimize fuel burn and/or support structures associated with the turbofan engine.

Example light weight fan casing configurations for energy absorption are disclosed herein. Further examples and combinations thereof include the following:

1. An apparatus comprising a first set of metal bands positioned within a containment casing of a turbofan engine, and a second set of metal bands traversing the first set of metal bands, the first set of metal bands and the second set of metal bands to surround at least a portion of the turbofan engine.
2. The apparatus of any preceding clause, wherein the first set of metal bands and the second set of metal bands include aluminum-lithium.
3. The apparatus of any preceding clause, wherein the first set of metal bands and the second set of metal bands are disposed along a circumference within the containment casing.
4. The apparatus of any preceding clause, wherein the first set of metal bands is positioned concentrically around the second set of metal bands.
5. The apparatus of any preceding clause, further including at least a third set of metal bands traversing or surrounding the first set of metal bands and the second set of metal bands.
6. The apparatus of any preceding clause, wherein the first set of metal bands and the second set of metal bands are integrated into the containment casing to provide at least one of stiffness or energy absorption.
7. The apparatus of any preceding clause, further including a deflector plate fixed to an external surface of the containment casing.
8. A casing apparatus comprising a first portion of a containment casing of a turbofan engine, a second portion of the containment casing, and a protruding portion of the containment casing positioned between the first portion and the second portion, the protruding portion including a structural lattice.
9. The casing apparatus of any preceding clause, wherein an inner portion of the structural lattice includes a first volume fraction and an outer portion of the structural lattice includes a second volume fraction, the first volume fraction greater than the second volume fraction.

10. The casing apparatus of any preceding clause, wherein the protruding portion of the containment casing includes curvature in two geometric planes.

11. The casing apparatus of any preceding clause, wherein the protruding portion of the containment casing is to align with fan blades of the turbofan engine.

12. The casing apparatus of any preceding clause, wherein the structural lattice is arranged between the first portion and the second portion to impart energy absorption and stiffness to the containment casing.

13. The casing apparatus of any preceding clause, wherein the structural lattice is a gyroid structure.

14. The casing apparatus of any preceding clause, wherein the protruding portion includes an abradable layer positioned between the structural lattice and an interior of the containment casing.

15. An apparatus comprising a containment casing of a turbofan engine, and a trench filler of the turbofan engine positioned between the turbofan engine and the containment casing, the trench filler including a first layer, the first layer including a solid metal, a second layer, the second layer including at least one of a lattice structure, air, or fluid, the first layer and the second layer to surround at least a portion of the turbofan engine, the first layer and the second layer to alternate in a radial direction.

16. The apparatus of any preceding clause, wherein a first section of the trench filler includes a first volume fraction to provide a stiffness to the containment casing.

17. The apparatus of any preceding clause, wherein a second section of the trench filler includes a second volume fraction to provide energy absorption, the second volume fraction less than the first volume fraction.

18. The apparatus of any preceding clause, wherein the first section of the trench filler is positioned within at least one of a fore portion or an aft portion of the containment casing and the second section of the trench filler is positioned within an intermediate portion of the containment casing between the fore portion and the aft portion.

19. The apparatus of any preceding clause, wherein the first section is positioned external to the second section in the radial direction.

20. The apparatus of any preceding clause, wherein the lattice structure is a gyroid structure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A casing apparatus comprising:

a first portion of a containment casing of a turbofan engine;

a second portion of the containment casing; and a protruding portion of the containment casing positioned between the first portion and the second portion, the protruding portion including a structural lattice in direct contact with an abradable layer and an outer wall, wherein the structural lattice is separated from an axial flow path defined by the turbofan engine across a length extending from the first portion to the second portion, wherein an inner portion of the structural lattice includes a first volume fraction and an outer portion of the structural lattice includes a second volume fraction, the first volume fraction greater than the second volume fraction, and wherein the outer wall is metal.

2. The casing apparatus of claim 1, wherein the protruding portion of the containment casing includes curvature in two geometric planes.

3. The casing apparatus of claim 1, wherein the protruding portion of the containment casing is to align with fan blades of the turbofan engine.

4. The casing apparatus of claim 1, wherein the structural lattice is arranged between the first portion and the second portion to impart energy absorption and stiffness to the containment casing.

5. The casing apparatus of claim 1, wherein the structural lattice is a gyroid structure.

6. The casing apparatus of claim 1, wherein the abradable layer is positioned between the structural lattice and the axial flow path defined by the turbofan engine.

7. The casing apparatus of claim 3, wherein the protruding portion is to surround the fan blades of the turbofan engine.

8. The casing apparatus of claim 7, wherein the fan blades are associated with more than one fan.

9. The casing apparatus of claim 5, wherein the gyroid structure includes an inner radial portion and an outer radial portion in direct contact with the inner radial portion, wherein the inner radial portion includes a first volume fraction, and wherein the outer radial portion includes a second volume fraction less than the first volume fraction.

10. The casing apparatus of claim 1, wherein the protruding portion includes an inner wall, wherein the inner wall and the outer wall are in contact with the structural lattice, wherein the outer wall has a first thickness, and the inner wall has a second thickness, and wherein the first thickness is greater than the second thickness.

11. The casing apparatus of claim 1, wherein the containment casing includes a first radius extending from a rotational axis of fan blades to an internal surface of an inner wall, and wherein the protruding portion includes a second radius extending from a center of the inner wall to the outer wall.

12. The casing apparatus of claim 1, wherein the first portion and the second portion include the outer wall, wherein the outer wall is un-interrupted between the first portion, the protruding portion, and the second portion, and wherein the protruding portion circumferentially surrounds fan blades of the turbofan engine.

13. A casing apparatus comprising:

a first portion of a containment casing of a turbofan engine;

a second portion of the containment casing; and a protruding portion of the containment casing positioned between the first portion and the second portion, the protruding portion including an inner wall, an outer wall, and a structural lattice positioned between the inner wall and the outer wall, the outer wall including curvature in an axial direction defined by the turbofan engine, the structural lattice including an inner radial portion and an outer radial portion in contact with and extending radially outward from the inner radial portion, the inner radial portion including a first volume fraction in a first section of the protruding portion that is separate from the inner wall and the outer wall, the outer radial portion including a second volume fraction different from the first volume fraction in a second section of the protruding portion that is separate from the outer wall.

14. The casing apparatus of claim 13, wherein a radius is defined between a center of the inner wall and the outer wall.

15. The casing apparatus of claim 13, wherein an outer radial perimeter of the structural lattice includes the curvature in the axial direction.

16. A casing apparatus comprising:

a first portion of a containment casing of a turbofan engine;

a second portion of the containment casing; and a protruding portion of the containment casing positioned between the first portion and the second portion, the protruding portion including an inner wall, an outer wall, and a structural lattice in contact with the inner wall and the outer wall, wherein the outer wall is metal, wherein an entirety of a portion of the outer wall that aligns with fan blades of the turbofan engine in an axial direction defined by the turbofan engine includes a first thickness, the inner wall including a second thickness aligned with the fan blades in the axial direction and positioned between the structural lattice and an axial flow path of the turbofan engine, the second thickness less than the first thickness.

17. The casing apparatus of claim 16, wherein the structural lattice includes an inner radial portion and an outer radial portion in contact with the inner radial portion, the inner radial portion including a first volume fraction, the outer radial portion including a second volume fraction, the first volume fraction greater than the second volume fraction.

18. The casing apparatus of claim 16, wherein the inner wall includes an abradable layer in contact with the structural lattice.

19. The casing apparatus of claim 16, wherein the outer wall includes curvature in an axial direction defined by the turbofan engine.

* * * * *